United States Patent Office
3,326,851
Patented June 20, 1967

3,326,851
PROCESS FOR PRODUCING AROMATIC
POLYAMIDE-ESTERS
Stanley Tocker, Wilmington, Del., assignor to E. I. du Pont de Nemours and Company, Wilmington, Del., a corporation of Delaware
No Drawing. Filed Dec. 23, 1963, Ser. No. 332,889
4 Claims. (Cl. 260—47)

This invention relates to the preparation of aromatic polyimide articles and coatings. More particularly, it relates to the preparation of relatively stable intermediates that can be easily converted to the polyimides when desired.

The importance of relatively stable intermediates that can be easily converted to the final desired product can be appreciated by one skilled in the art. The final products, the aromatic polyimides, are known for their chemical and thermal stability. Since they do not melt easily nor dissolve easily, the difficulty of shaping this polymer into useful articles is a serious obstacle to commercial development. Recently, processes utilizing the shaping of a polyamide-acid intermediate followed by conversion to the polyimide have been proposed. However, the polyamide-acids, in many cases, tend to convert to polyimides during storage or, in some cases, are of high stability, converting only upon exposure to temperatures which are extremely high for organic materials.

It is an object of this invention to provide intermediates that are sufficiently stable to be stored for long periods, yet sufficiently "unstable" to convert relatively easily to polyimide when desired. Other objects will appear hereinafter.

The objects are accomplished by the use of an intermediate linear polymer, an aromatic polyamide-ester having the formula:

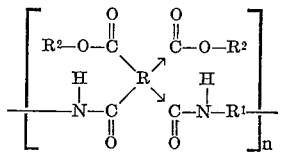

wherein the arrows denote isomerism; [1]

R is an aromatic tetravalent organic radical;
$R^1$ is arylene;
$R^2$ is alkyl or aryl; and
n is an integer sufficiently high to provide a film-forming polymer, i.e., having an inherent viscosity at 30° C. of at least .05, preferably 0.3–5.0, as measured as a 0.5% solution in a suitable solvent, e.g., N,N-dimethylacetamide.

The process for producing such polyamide-esters broadly involves heating aromatic tetracarboxylic acid esters with at least one aromatic diamine. One embodiment involves stepwise heating, first to polyamide-ester and then to polyimide. Another is heating a solution of an aromatic diamine in an aromatic tetracarboxylic acid tetraester.

The aromatic tetracarboxylic acid esters may be prepared by any method well known to those skilled in the art. Thus, one process, the preferred process, for producing the tetraester involves first treating suitable dianhydrides (aromatic dianhydrides) with an alcohol to form the corresponding diester diacid and then treating the diester diacid with a thionyl halide, a phosphorus halide, a benzal halide, an oxalyl halide or a carbonyl halide, e.g., thionyl chloride, phosphorus penta or trichloride, benzotrichloride, or phosgene, to form the corresponding diacyl halide. The diacyl halide may also be prepared by direct half-esterification of the tetra acid to the diester diacid followed by transformation of the free carboxyl groups to acid chloride groups. In either case, the next step is treatment with an alcohol (or sodium alkoxide) to form the tetraester. If the same alcohol as used to prepare the diester diacid is used, then the tetraester will have four identical ester groups. If a different alcohol is used, a mixed tetraester is formed. This method of preparing the tetraester is described in "Synthetic Organic Chemistry" by Wagner and Zook, pp. 480–489. It is the preferred method of making mixed tetraesters.

Another method involves the reaction of either the tetraacid or the dianhydride with an excess of alcohol or phenol in a solvent such as benzene in the presence of a strong acid catalyst, e.g., sulfuric acid, benzene sulfonic acid, para-toluene sulfonic acid, etc. The water formed from the reaction is removed continuously by any known method, e.g., distillation of the water/benzene azeotrope. Still another method for preparing the tetraester is by condensation of a salt of the tetraacid with an alkyl halide, e.g., the silver salt of the tetraacid with methyl iodide.

The starting materials for forming the products by the process of the present invention are aromatic diamines and tetraesters of aromatic tetracarboxylic acids. The organic diamines are characterized by the formula:

$$H_2N—R^1—NH_2$$

wherein $R^1$ is a divalent aromatic radical (arylene), preferably selected from the following groups: phenylene, naphthylene, biphenylene, anthrylene, furylene, benzfurylene and

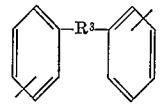

wherein $R^3$ is selected from the group consisting of an alkylene chain having 1–3 carbon atoms, —O—, —S—, —SO$_2$—,

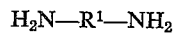

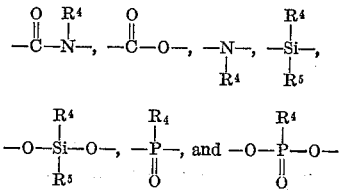

wherein $R^4$ and $R^5$ are alkyl or aryl, and substituted groups thereof. Among the diamines which are suitable for use in the present invention are:

meta-phenylene diamine;
para-phenylene diamine;
2,2-bis(4-amino-phenyl) propane;
4,4'-diamino-diphenyl methane;
4,4'-diamino-diphenyl sulfide;
4,4'-diamino-diphenyl sulfone;
3,3'-diamino-diphenyl sulfone;
4,4'-diamino-diphenyl ether;
2,6-diamino-pyridine;
2,4-diamino cumene;
bis(4-amino-phenyl)diethyl silane;
benzidine;
3,3'-dichloro-benzidine;
3,3'-dimethoxy benzidine;
bis(4-amino-phenyl)ethyl phosphine oxide;
bis(4-amino-phenyl)phenyl phosphine oxide;
bis(4-amino-phenyl)-N-butylamine;
bis(4-amino-phenyl)-N-methylamine;

---
[1] In any recurring unit the groups to which arrows point may exist as shown or in interchanged position.

1,5-diamino-naphthalene;
3,3'-dimethyl-4,4'-diaminobiphenyl;
N-(3-aminophenyl)-4-aminobenzamide;
4-aminophenyl-3-aminobenzoate;
and mixtures thereof.

The aromatic tetracarboxylic acid esters are characterized by the following formula:

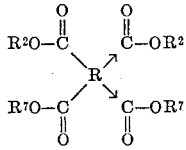

wherein R is a tetravalent aromatic radical, e.g.

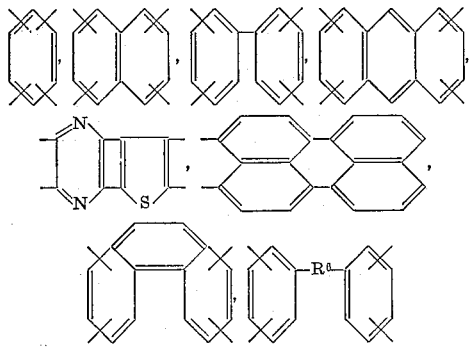

wherein $R^6$ is selected from the group consisting of $R^3$ and

$R^2$ is alkyl or aryl; and $R^7$ is alkyl or aryl. Usually the pairs of $R^2$ and $R^7$, when they differ, differ considerably from each other, i.e., methyl or ethyl as $R^2$ and phenyl or cresyl as $R^7$.

In these dianhydrides every carbonyl group is attached directly to a separate carbon atom of the aromatic radical, the carbonyl groups being in pairs, the groups of each pair being adjacent to each other. Adjacent means ortho or peri, so that the dicarboxylanhydro rings are 5- or 6-membered, respectively.

The preferred aromatic dianhydrides are those in which the carbon atoms of each pair of carbonyl groups are directly attached to ortho carbon atoms in the R group to provide a 5-membered ring as follows:

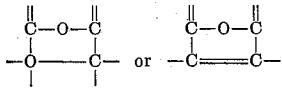

Illustrations of dianhydrides suitable for use in the present invention include:

pyromellitic dianhydride;
2,3,6,7-naphthalene tetracarboxylic dianhydride;
3,3',4,4'-diphenyl tetracarboxylic dianhydride;
1,2,5,6-naphthalene tetracarboxylic dianhydride;
2,2',3,3'-diphenyl tetracarboxylic dianhydride;
2,2,-bis(3,4-dicarboxyphenyl) propane dianhydride;
bis(3,4-dicarboxyphenyl) sulfone dianhydride;
3,4,9,10-perylene tetracarboxylic dianhydride;
bis(3,4-dicarboxyphenyl) ether dianhydride;
naphthalene-1,2,4,5-tetracarboxylic dianhydride;
naphthalene-1,4,5,8-tetracarboxylic dianhydride;
2,6-dichloronaphthalene-1,4,5,8-tetracarboxylic dianhydride;
2,7-dichloronaphthalene-1,4,5,8-tetracarboxylic dianhydride;
2,3,6,7-tetrachloronaphthalene-1,4,5,8-tetracarboxylic dianhydride;
phenanthrene-1,8,9,10-tetracarboxylic dianhydride;
2,2-bis(2,3-dicarboxyphenyl) propane dianhydride;
1,1-bis(2,3-dicarboxyphenyl) ethane dianhydride;
1,1-bis(3,4-dicarboxyphenyl) ethane dianhydride;
bis(2,3-dicarboxyphenyl) methane dianhydride;
bis(3,4-dicarboxyphenyl) methane dianhydride;
bis(3,4-dicarboxyphenyl) sulfone dianhydride;
benzene-1,2,3,4-tetracarboxylic dianhydride;
3,4,3',4'-benzophenone tetracarboxylic dianhydride;
2,3,2',3'-benzophenone tetracarboxylic dianhydride;
2,3,3',4'-benzophenone tetracarboxylic dianhydride; etc.

The inclusion of one or more diamines or dianhydrides other than those disclosed, e.g. aliphatic diamines or aliphatic dianhydrides, as reactants in the process may detract from one or more desirable properties of the polymeric products. However, the inclusion of such materials, to the extent that they do not detract substantially from the desirable results obtained with the aromatic reactants, is contemplated.

In the first step, the aromatic dianhydride, usually as a solid, is treated with an alcohol to form the corresponding diester-diacid. The operable alcohols include methanol, ethanol, n-propanol, iso-propanol, the butanols, the pentanols, the hexanols, 2-ethylhexanol, isooctyl alcohol, lauryl alcohol, allyl alcohol, i.e., aliphatic alcohols of 1–12 carbon atoms, phenol and other aromatic alcohols such as substituted phenols (cresol), cyanoethanol and other substituted aliphatic alcohols of 1–12 carbon atoms, etc. The aromatic alcohols are preferred. This reaction is performed at room temperature.

Excess alcohol is removed usually by distillation or extraction, and the next step is a treatment of the diesterdiacid with a halide to convert the diester-diacid to the corresponding diester-diacyl halide. This reaction is also performed at room temperature and involves the addition of one of the following: thionyl halide, a phosphorus halide, a benzal halide, an oxalyl halide or a carbonyl halide in a solvent. Finally, additional or a different alcohol is used to form the tetraester.

The next step is to polymerize the tetraester by reaction with at least one of the aforementioned diamines. It is preferable for polymerization to the polyamide-ester stage to occur exclusively through non-adjacent carboalkoxy or carboaryloxy groups, leaving a free carboalkoxy or carboaryloxy group adjacent to each amide linkage for subsequent cyclization to the desired cyclic imide. The desired formation involving non-adjacent carboalkoxy or carboaryloxy groups is favored by the use of the mixed tetraesters. In such cases polyamide-ester formation occurs preferentially through one pair of identical carboalkoxy or carbophenoxy groups, thereby greatly reducing the possibility of a double exchange on adjacent ester groups. Polymerization to high molecular weight is favored by molar balance of diamine and tetraester, i.e., no larger excess of either than about 5–10%.

The reaction, however, proceeds with larger excesses of either reagent. In some such cases, the diamine may not be completely soluble, at least until the reaction temperature is reached. Complete miscibility is beneficial but not essential.

The diamine can be added to the liquid tetraester or vice versa. An advantage of this process is that most tetraesters of aromatic tetracarboxylic acids such as pyromellitic acid are liquid, so that solutions of the aromatic diamines in these esters (before reaction) can be cast into films or otherwise shaped into desired forms such as fibers. These shaped structures can then be polymerized thermally in bulk form to the intermediate polyamide-ester. In the event that the ester is not a liquid, then a solvent may be used. The solvent may be any of those disclosed in U.S. patent application Ser. No. 288,535 filed June 17, 1963, and assigned to the assignee of this present application.

An advantage of using the aryl esters, either diaryl in a mixed ester or tetraaryl, is that the aromatic alcohol (phenol or cresol) liberated during the reaction acts as a plasticizer for the polymer mass. This plasticization is beneficial in cases where shaping of the intermediate melt is desired.

The exact heating conditions depend largely on the nature of ester groups. Some alcohols split out more readily than others, and the lower boiling ones, of course, are easier to remove from the reaction mixture. Generally, it is sufficient to heat a solution of the diamine in the tetraester at 150° C. to 300° C. to produce a polyamide-ester. One can shape the polyamide-ester and then heat at about 175–400° C. to convert the polymer into polyimide. Alternatively, one can cast into a film a solution of the diamine in the tetraester, followed by heating at 150° C. to 300° C., and then to at least 310° C. to complete the conversion to polyimide. Sometimes, as with the higher alkyls and the aryls, reduced pressure is needed to aid in removing the alcohol or phenol.

It should be noted that the reaction mixture itself can be used as a self-curing adhesive. This mixture contains varying amounts of polyamide-ester of varying molecular weight, depending upon when the polymerization is interrupted for use of the mixture. If polymerization has proceeded far enough to permit shaping into a self-supporting film, the product can be used conveniently as an adhesive film. In all cases, thermal curing produces a polyimide layer. These simple operations can be used in coating various substrates uniformly even though they may be porous and/or have irregular surfaces. Coated materials which can be bonded to themselves or to other materials include aluminum foil, steel sheeting, plywood, Masonite, paper, glass, asbestos, and various fabrics and films made of substances described above.

If the reaction mixture is not used but is converted completely to the polyamide-ester, the polyamide-ester composition may be stored at this point for later use or it may be immediately used to form shaped articles. After shaping the composition composed predominantly of the polyamide-ester either immediately or after storage or after sale, preferable still in the solvent (usually at least 60% solvent), into a useful article, e.g., filament, film, tube, rod, powder, etc., and drying the article, it is preferred to convert the polyamide-ester to another polymer to modify the properties of the shaped structure. Thus, the polyamide-ester may be converted by heat treatment to the corresponding polyimide, specifically by heating to a temperature of at least 125° C., preferably at least 300° C., to drive off alcohol. The polyimide has the following structural formula:

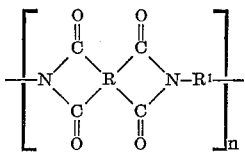

wherein R is an aromatic tetravalent radical;

$R^1$ is arylene; and $n$ is an integer sufficiently high to provide an inherent viscosity of at least 0.05, preferably 0.3–5.0, as measured as a 0.5% solution in a suitable solvent.

The final shaped article may consist of the polyimide alone or as a blend with other polymers and/or modified with inert materials. Depending on their nature, the inert materials may be added before or after shaping. For example, fillers such as pigments, electrically conductive carbon black and metal particles, abrasives, dielectrics and lubricating polymers may be added conveniently to the intermediate polymer as such or in a solution of the intermediate polymer before shaping. Certain abrasives and electrically conductive materials are better added as surface layers. A cellular form or foam of the final polymer may be produced by adding a conventional blowing agent to the intermediate polymer, either alone or in combination with a filler, followed by heating to decompose the agent and cyclize the polymer units. Alternatively, cellular products can be made by dispersing bubbles (of air, carbon dioxide, nitrogen, etc.) into a melt or solution of the intermediate polymer before shaping and cyclization.

Instead of being shaped itself, the intermediate polymer can be used as a coating composition. The liquid coating composition containing the polymer, either alone or modified by the addition of fillers and/or foaming agents, may be applied by any of the usual techniques (doctoring, rolling, dipping, brushing, spraying) to a great variety of substrates. Such substrates include copper, brass, aluminum, steel, and other metals in the form of sheets, fibers, wires, screening; mineral structures such as asbestos; glass in the form of sheets, fibers, foams, fabrics, etc.; polymeric materials such as cellulosic materials (cellophane, wood, paper, etc.); polyolefins (polyethylene, polypropylene, polystyrene, etc.); polyesters (polyethylene terephthalate, etc.), polyamides, polyimides, perfluorocarbon polymers (polytetrafluoroethylene, copolymers of tetrafluoroethylene with hexafluoropropylene, etc.), polyurethanes, in the form of sheets, fibers, foams, woven and non-woven fabrics, screening, etc.; leather sheets; etc. The polymeric substrates can be metallized before coating, or treated with a conventional adhesive or other agent to improve surface receptivity. Films of the final cyclized polymer can be laminated to any of the above substrates, often with the aid of a commercially available adhesive. Instead of using a fluid or semi-solid polyamide-ester composition as a coating on one or both pieces to be adhered together, or of using a polyamide-ester film as an intermediate adhesive layer, one can use similarly an adhesive sheet made by impregnating a paper or fabric with a fluid polyamide-ester composition, e.g., an adhesive tape.

The polyamide-esters, when isolated, are found to be colorless or light yellow solids. They have strong infrared bands at 3.0–3.07 microns due to N–H bonds of the amide, 5.8 microns due to C=O bonds of the ester and 6.05 microns due to C=O bonds of the amide.

The invention will be more clearly understood by referring to the examples which follow, Example 1 representing the best mode contemplated for practicing the invention. It is understood that the examples, although illustrating specific embodiments of the present invention should not be considered limitative of the invention.

The determination of the structure is accomplished by Infrared Spectral Techniques [2] known to those skilled in the art. The infrared spectra herein were taken on pressed films by the use of a Perkin-Elmer model 21 spectrophotometer and a Perkin-Elmer Infracord spectrophotometer.

Inherent viscosity, which is directly related to the molecular weight of the polymer, is defined by L. H. Cragg in the Journal of Colloid Science, volume I, pages 261–9 (May 1946) as:

$$\text{Inherent viscosity} = \frac{\ln \text{ relative viscosity}}{C}$$

where relative viscosity is the ratio of the solution viscosity to the solvent viscosity, and $C$ is the concentration of solute in solution measured as grams of polymer per 100 ml. of solution.

*Example 1*

The symmetrical dimethyl diphenyl ester of pyromellitic acid is prepared as described in "Synthetic Organic Chemistry" by Wagner and Zook, using methanol, thionyl chloride and phenol. The tetraester is mixed with an equimolar amount of 2,4-diaminocumene, also known as 2,4-diamino isopropylbenzene. As the mixture is heated, the

---

[2] W. M. D. Bryant and R. C. Voter, Journal of American Chemical Society, 75, 6113 (1953); and F. W. Billmeyer, "Textbook of Polymer Chemistry," chapter 7, Interscience Publishers, 1957.

components form a dark orange liquid in about 5 minutes at 195° C. Heating is continued over about two more hours until the temperature has reached 280° C. The polymer at this stage is largely polyamide ester and is soft and shapeable into a film. The reaction mass is heated gradually to 325° C., with concurrent reduction in pressure to 0.10 mm. The product is soluble in N,N-dimethylacetamide and has an inherent viscosity of 0.08 as a 0.5% solution in N,N-dimethylacetamide. The infrared spectrum of this polymer shows characteristic imide absorption bands at 5.66 microns and 13.84 microns and the chemical analysis fits that of the cumene polypyromellitimide. The final polyimide film has good physical and electrical properties.

*Examples 2–8*

The corresponding polyamide-ester results from substituting each of the following esters for the dimethyl diphenyl ester of Example 1:

tetramethyl pyromellitate,
tetraethyl pyromellitate,
tetraallyl pyromellitate,
tetraphenyl pyromellitate,
tetracresyl pyromellitate,
dimethyl diethyl pyromellitate and
diphenyl diethyl pyromellitate.

The tetraesters of Examples 2–6 are prepared readily by reacting 4 moles of the alcohol or phenol with the tetraacid in benzene in the presence of sulfuric acid as a strong acid catalyst. The mixed tetraesters of Examples 7 and 8 are prepared as in Example 1.

After being shaped into films, the polyamide-esters are converted to cumene polypyromellitimide films having satisfactory properties by heating gradually to 325–350° C.

*Examples 9–10*

The corresponding polyimides are produced by substituting the following esters and diamines in Example 1: Example 9, tetramethyl ester of 3,4,3',4'-benzophenone tetracarboxylic acid and bis(4-aminophenyl) ether; Example 10, tetraethyl pyromellitate and m-phenylene diamine.

What is claimed is:
1. A process for preparing a polyamide-ester which comprises reacting at least one diamine of the formula

$$H_2N-R^1-NH_2$$

wherein $R^1$ is a divalent aromatic radical selected from the group consisting of phenylene, naphthylene, biphenylene, anthrylene, furylene, benzfurylene and

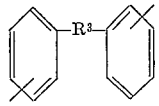

wherein $R^3$ is selected from the group consisting of an alkylene chain having 1–3 carbon atoms, —O—, —S—, —SO$_2$—,

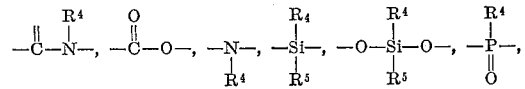

and

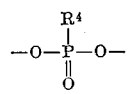

wherein $R^4$ and $R^5$ are alkyl or aryl, with a tetraester of an aromatic, tetracarboxylic acid for a time sufficient and at an elevated temperature below about 300° C. sufficient to form the polyamide-ester.

2. A process in accordance with claim 1 in which a solution of said diamine in said tetraester is formed and is then cast to a film, and the film is heated to produce the polyamide-ester.

3. A process as in claim 1 wherein said ester is selected from the group consisting of dimethyl diphenyl pyromellitate, tetramethyl pyromellitate, tetraethyl pyromellitate, tetraallyl pyromellitate, tetraphenyl pyromellitate, tetracresyl pyromellitate, dimethyl diethyl pyromellitate, diethyl diphenyl pyromellitate, and the tetramethyl ester of 3,4,3',4'-benzophenone tetracarboxylic acid.

4. A process as in claim 1 wherein said diamine is selected from the group consisting of 2,4-diaminoisopropylbenzene, bis(4-aminophenyl) ether and m-phenylene diamine.

References Cited

UNITED STATES PATENTS

| 3,037,966 | 6/1962 | Chow et al. | 260—78 |
| 3,179,633 | 4/1965 | Endrey | 260—78 |
| 3,179,634 | 4/1965 | Edwards | 260—78 |

FOREIGN PATENTS

| 570,858 | 7/1945 | Great Britain. |

WILLIAM R. SHORT, *Primary Examiner.*

H. D. ANDERSON, *Assistant Examiner.*